United States Patent
Dabak et al.

(10) Patent No.: US 8,144,747 B2
(45) Date of Patent: *Mar. 27, 2012

(54) PRIMARY AND SECONDARY SYNCHRONIZATION CODES FROM FIRST, SECOND, THIRD SEQUENCES

(75) Inventors: Anand G. Dabak, Parker, TX (US);
Sundararajan Sriram, Plano, TX (US);
Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/949,413

(22) Filed: Nov. 18, 2010

(65) Prior Publication Data

US 2011/0064071 A1   Mar. 17, 2011

Related U.S. Application Data

(62) Division of application No. 12/638,468, filed on Dec. 15, 2009, now Pat. No. 7,860,152, which is a division of application No. 11/438,149, filed on May 22, 2006, now Pat. No. 7,656,934, which is a division of application No. 09/595,561, filed on Jun. 16, 2000, now Pat. No. 7,103,085.

(60) Provisional application No. 60/140,006, filed on Jun. 18, 1999.

(51) Int. Cl.
*H04B 1/69* (2011.01)
*H04B 1/707* (2011.01)
*H04B 1/713* (2011.01)

(52) U.S. Cl. ........ 375/146; 375/142; 375/145; 370/208; 370/235; 370/342

(58) Field of Classification Search ........ 375/146, 375/142, 145; 370/208, 235, 342
See application file for complete search history.

(56) References Cited

U.S. PATENT DOCUMENTS

| | | | |
|---|---|---|---|
| 6,526,091 B1 * | 2/2003 | Nystrom et al. | 375/142 |
| 7,103,085 B1 * | 9/2006 | Dabak et al. | 375/132 |
| 7,656,934 B2 * | 2/2010 | Dabak et al. | 375/146 |
| 7,860,152 B2 * | 12/2010 | Dabak et al. | 375/146 |

* cited by examiner

*Primary Examiner* — Phuong Phu
(74) *Attorney, Agent, or Firm* — Ronald O. Neerings; Wade James Brady, III; Frederick J. Telecky, Jr.

(57) ABSTRACT

A wireless communication system. The system comprises transmitter circuitry (BST1), the transmitter circuitry comprising encoder circuitry (50) for transmitting a plurality of frames (FR). Each of the plurality of frames comprises a primary synchronization code (PCS) and a secondary synchronization code (SSC). The encoder circuitry comprises of circuitry ($50_1$) for providing the primary synchronization code in response to a first sequence (32). The encoder circuitry further comprises circuitry ($50_2$) for providing the secondary synchronization code in response to a second sequence (54) and a third sequence (56). The second sequence is selected from a plurality of sequences. Each of the plurality of sequences is orthogonal with respect to all other sequences in the plurality of sequences. The third sequence comprises a subset of bits from the first sequence.

3 Claims, 6 Drawing Sheets

FIG. 3

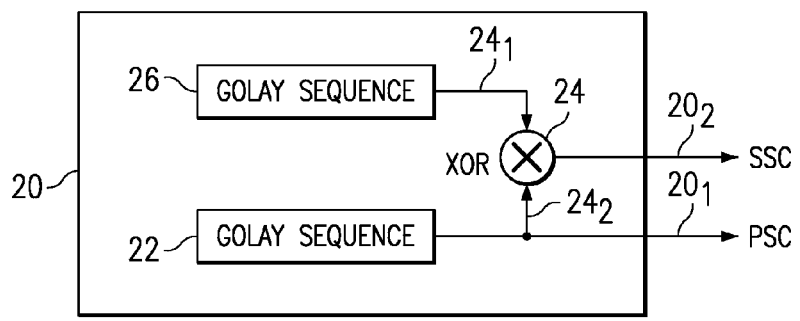

FIG. 4a

| K | ()...7.. | | | | | | | | | | | | | ........127 | |
|---|---|---|---|---|---|---|---|---|---|---|---|---|---|---|---|
| $X_1$ | A | A | B | B | A | −A | −B | B | A | −A | B | −B | A | A | −B | −B |
| $X_2$ | A | A | B | B | A | −A | −B | B | −A | A | −B | B | −A | −A | B | B |
| $X_3$ | A | −A | B | −B | A | A | −B | −B | A | A | B | B | A | −A | −B | B |
| $X_4$ | A | −A | B | −B | A | A | −B | −B | −A | −A | −B | −B | −A | A | B | −B |
| $X_5$ | A | A | B | B | −A | A | B | −B | A | −A | B | −B | −A | −A | B | B |
| $X_6$ | A | A | B | B | −A | A | B | −B | −A | A | −B | B | A | A | −B | −B |
| $X_7$ | A | −A | B | −B | −A | −A | B | B | A | A | B | B | −A | A | B | −B |
| $X_8$ | A | −A | B | −B | −A | −A | B | B | −A | −A | −B | −B | A | −A | −B | B |
| $X_9$ | A | A | −B | −B | A | −A | B | −B | A | −A | −B | B | A | A | B | B |
| $X_{10}$ | A | A | −B | −B | A | −A | B | −B | −A | A | B | −B | −A | −A | −B | −B |
| $X_{11}$ | A | −A | −B | B | A | A | B | B | A | A | −B | −B | A | −A | B | −B |
| $X_{12}$ | A | −A | −B | B | A | A | B | B | −A | −A | B | B | −A | A | −B | B |
| $X_{13}$ | A | A | −B | −B | −A | A | −B | B | A | −A | −B | B | −A | −A | −B | −B |
| $X_{14}$ | A | A | −B | −B | −A | A | −B | B | −A | A | B | −B | A | A | B | B |
| $X_{15}$ | A | −A | −B | B | −A | −A | −B | −B | A | A | −B | −B | −A | A | −B | B |
| $X_{16}$ | A | −A | −B | B | −A | −A | −B | −B | −A | −A | B | B | A | −A | B | −B |
| $X_{17}$ | B | B | A | A | B | −B | A | A | B | −B | A | −A | B | B | −A | −A |

| S(0) | $X_1$ | $-X_1$ |
|---|---|---|
| S(1) | $X_2$ | $-X_2$ |
| S(2) | $X_3$ | $-X_3$ |
| S(3) | $X_4$ | $-X_4$ |
| S(4) | $X_5$ | $-X_5$ |
| S(5) | $X_6$ | $-X_6$ |
| S(6) | $X_7$ | $-X_7$ |
| S(7) | $X_8$ | $-X_8$ |
| S(8) | $X_9$ | $-X_9$ |
| S(9) | $X_{10}$ | $-X_{10}$ |
| S(10) | $X_{11}$ | $-X_{11}$ |
| S(11) | $X_{12}$ | $-X_{12}$ |
| S(12) | $X_{13}$ | $-X_{13}$ |
| S(13) | $X_{14}$ | $-X_{14}$ |
| S(14) | $X_{15}$ | $-X_{15}$ |
| S(15) | $X_{16}$ | $-X_{16}$ |
| S(16) | $X_{17}$ | $-X_{17}$ |

| CODE \ CODE | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 1 | 248 | 8 | 16 | 8 | 32 | 8 | 16 | 8 | 64 | 8 | 16 | 8 | 32 | 8 | 16 | 8 | 128 |
| 2 | 8 | 240 | 248 | 16 | 8 | 32 | 24 | 16 | 8 | 64 | 56 | 16 | 8 | 32 | 24 | 16 | 8 |
| 3 | 16 | 248 | 240 | 8 | 16 | 24 | 32 | 8 | 16 | 56 | 64 | 8 | 16 | 24 | 32 | 8 | 16 |
| 4 | 8 | 16 | 8 | 224 | 120 | 240 | 120 | 32 | 8 | 16 | 8 | 64 | 24 | 48 | 24 | 32 | 8 |
| 5 | 32 | 8 | 16 | 120 | 224 | 120 | 240 | 8 | 32 | 8 | 16 | 24 | 64 | 24 | 48 | 8 | 32 |
| 6 | 8 | 32 | 24 | 240 | 120 | 224 | 136 | 16 | 8 | 32 | 24 | 48 | 24 | 64 | 40 | 16 | 8 |
| 7 | 16 | 24 | 32 | 120 | 240 | 136 | 224 | 8 | 16 | 24 | 32 | 24 | 48 | 40 | 64 | 8 | 16 |
| 8 | 8 | 16 | 8 | 32 | 8 | 16 | 8 | 200 | 56 | 112 | 56 | 224 | 56 | 112 | 56 | 64 | 8 |
| 9 | 64 | 8 | 16 | 8 | 32 | 8 | 16 | 56 | 200 | 56 | 112 | 56 | 224 | 56 | 112 | 8 | 64 |
| 10 | 8 | 64 | 56 | 16 | 8 | 32 | 24 | 112 | 56 | 192 | 200 | 112 | 56 | 224 | 168 | 16 | 8 |
| 11 | 16 | 56 | 64 | 8 | 16 | 24 | 32 | 56 | 112 | 200 | 192 | 56 | 112 | 168 | 224 | 8 | 16 |
| 12 | 8 | 16 | 8 | 64 | 24 | 48 | 24 | 224 | 56 | 112 | 56 | 192 | 72 | 144 | 72 | 32 | 8 |
| 13 | 32 | 8 | 16 | 24 | 64 | 24 | 48 | 56 | 224 | 56 | 112 | 72 | 192 | 72 | 144 | 8 | 32 |
| 14 | 8 | 32 | 24 | 48 | 24 | 64 | 40 | 112 | 56 | 224 | 168 | 144 | 72 | 192 | 184 | 16 | 8 |
| 15 | 16 | 24 | 32 | 24 | 48 | 40 | 64 | 56 | 112 | 168 | 224 | 72 | 144 | 184 | 192 | 8 | 16 |
| 16 | 8 | 16 | 8 | 32 | 8 | 16 | 8 | 64 | 8 | 16 | 8 | 32 | 8 | 16 | 8 | 232 | 24 |
| 17 | 128 | 8 | 16 | 8 | 32 | 8 | 16 | 8 | 64 | 8 | 16 | 8 | 32 | 8 | 16 | 24 | 232 |

| CODE\CODE | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 1 | 95 | 72 | 64 | 64 | 72 | 72 | 72 | 80 | 56 | 64 | 104 | 104 | 72 | 72 | 88 | 88 | 72 |
| 2 | 72 | 97 | 64 | 64 | 72 | 72 | 80 | 72 | 64 | 56 | 104 | 104 | 72 | 72 | 88 | 88 | 80 |
| 3 | 64 | 64 | 89 | 64 | 72 | 80 | 72 | 72 | 104 | 104 | 56 | 64 | 88 | 88 | 72 | 72 | 64 |
| 4 | 64 | 64 | 64 | 103 | 80 | 72 | 72 | 72 | 104 | 104 | 64 | 56 | 88 | 88 | 72 | 72 | 88 |
| 5 | 72 | 72 | 72 | 80 | 97 | 72 | 72 | 72 | 72 | 120 | 88 | 80 | 80 | 72 | 120 | 120 | 96 |
| 6 | 72 | 72 | 80 | 72 | 72 | 95 | 72 | 72 | 120 | 72 | 80 | 72 | 88 | 80 | 120 | 120 | 104 |
| 7 | 72 | 80 | 72 | 72 | 72 | 72 | 87 | 48 | 80 | 88 | 120 | 72 | 120 | 120 | 80 | 64 | 72 |
| 8 | 80 | 72 | 72 | 72 | 72 | 72 | 72 | 105 | 8 | 88 | 80 | 72 | 120 | 120 | 64 | 80 | 104 |
| 9 | 56 | 64 | 104 | 104 | 72 | 120 | 80 | 88 | 97 | 72 | 88 | 88 | 80 | 96 | 88 | 96 | 128 |
| 10 | 64 | 56 | 104 | 104 | 120 | 72 | 88 | 80 | 72 | 95 | 88 | 88 | 96 | 80 | 96 | 88 | 72 |
| 11 | 104 | 104 | 56 | 64 | 88 | 80 | 120 | 72 | 88 | 88 | 87 | 88 | 80 | 96 | 80 | 96 | 80 |
| 12 | 104 | 104 | 64 | 56 | 80 | 88 | 72 | 120 | 88 | 88 | 88 | 105 | 96 | 80 | 96 | 80 | 80 |
| 13 | 72 | 72 | 88 | 88 | 80 | 72 | 120 | 120 | 80 | 96 | 80 | 96 | 95 | 88 | 72 | 80 | 104 |
| 14 | 72 | 72 | 88 | 88 | 72 | 80 | 120 | 120 | 96 | 80 | 96 | 80 | 88 | 97 | 80 | 72 | 88 |
| 15 | 88 | 88 | 72 | 72 | 120 | 120 | 80 | 64 | 88 | 96 | 80 | 96 | 72 | 80 | 89 | 64 | 72 |
| 16 | 88 | 88 | 72 | 72 | 120 | 120 | 64 | 80 | 96 | 88 | 96 | 80 | 80 | 72 | 64 | 103 | 72 |
| 17 | 72 | 80 | 64 | 88 | 96 | 104 | 72 | 104 | 128 | 72 | 80 | 80 | 104 | 88 | 72 | 72 | 93 |

APERIODIC CROSS-CORRELATION OF THE COMMA FREE CODES

APERIODIC CROSS-CORRELATION OF THE COMMA FREE CODES

PRIMARY AND SECONDARY SYNCHRONIZATION CODES FROM FIRST, SECOND, THIRD SEQUENCES

This application is a divisional of prior application Ser. No. 12/638,468, filed Dec. 15, 2009, now U.S. Pat. No. 7,860,152, issued Dec. 28, 2010;
Which was a divisional of prior application Ser. No. 11/438,149, filed May 22, 2006, now U.S. Pat. No. 7,656,934, granted on Feb. 2, 2010; Which was a divisional of prior application Ser. No. 09/595,561, filed Jun. 16, 2000, now U.S. Pat. No. 7,103,085, granted on Sep. 5, 2006; Which claims priority from Provisional Application No. 60/140,006, filed Jun. 18, 1999.

STATEMENT REGARDING FEDERALLY SPONSORED RESEARCH OR DEVELOPMENT

Not Applicable.

BACKGROUND OF THE INVENTION

The present embodiments relate to wireless communications systems and, more particularly, to communication of primary and secondary synchronization codes in such systems.

Wireless communications have become very prevalent in business, personal, and other applications, and as a result the technology for such communications continues to advance in various areas. One such advancement includes the use of spread spectrum communications, including that of code division multiple access ("CDMA") and wideband code division multiple access ("WCDMA") cellular communications. In such communications, a user station (e.g., a hand held cellular phone) communicates with a base station, where typically the base station corresponds to a "cell." To accomplish the communication from a user station to a base station, the user station must synchronize itself to a base station, and this synchronization process requires the user station to detect both a primary synchronization code ("PSC") and a secondary synchronization code ("SSC") as transmitted from a base station. The PSC is transmitted with the same encoded information for numerous base stations while each base station transmits a unique SSC. The synchronization process typically occurs when a user station is initially turned on and also thereafter when the user station, if mobile, moves from one cell to another, where this movement and the accompanying signal transitions are referred to in the art as soft handoff. Once the PSC is detected, the user station is thereby informed of the periodic timing of the communications. Once the SSC is detected, the user station is thereby informed of the data (i.e., frame) location within the base station communications. Further, once the user station has detected a unique base station SSC, the user station also may identify a so-called group of long codes that is also unique to, and transmitted by, the base station, where that long code is then usable by the user station to demodulate data received from the base station.

While various approaches have in the past been proposed or implemented in connection with the synchronization methods described above, the present inventors have determined that such approaches may be improved. For example and as detailed later, when a user station attempts to identify the SSC of a base station, the user station typically implements a correlation evaluation technique to decipher transmissions from the base station, where an example of such a technique is a Walsh-Hadamard transform. The technique effectively allows the user station to compare different possible SSCs with the actual SSC embedded in the base station's transmissions. When a sufficiently large correlation is detected, then the user station has a corresponding level of confidence that it has detected the base station's SSC. While the preceding approach provides a certain probability that an SSC will be detected properly by a user station, it is recognized in connection with the present inventive embodiments that such a probability may be improved as compared to the prior art. Specifically, it is further recognized in connection with the present inventive embodiments that a prior art approach may provide false SSC detections by the user station, that is, a user station may conclude that it has detected a base station SSC due to a high cross-correlation finding during the user station's analysis, when in fact the high cross-correlation arises from a different SSC that does not correspond to the actually correct base station SSC. In this case, if the user station concludes it has detected the proper SSC when in fact it has detected an erroneous SSC, then the user station may attempt to communicate with the base station while using an incorrect SSC and thereby preventing such communications from properly occurring. Thus, as the user station compares various possible SSCs against a base station transmission having a unique base station SSC, there is a need to present a relatively large correlation detected by the user station when the proper SSC is being considered as compared to presenting a relatively small correlation detected by a user station when other SSCs are being considered. This need is addressed by the preferred embodiments, as described below.

BRIEF SUMMARY OF THE INVENTION

In the preferred embodiment, there is a wireless communication system. The system comprises transmitter circuitry, the transmitter circuitry comprising encoder circuitry for transmitting a plurality of frames. Each of the plurality of frames comprises a primary synchronization code and a secondary synchronization code. The encoder circuitry comprises of circuitry for providing the primary synchronization code in response to a first sequence. The encoder circuitry further comprises circuitry for providing the secondary synchronization code in response to a second sequence and a third sequence. The second sequence is selected from a plurality of sequences. Each of the plurality of sequences is orthogonal with respect to all other sequences in the plurality of sequences. The third sequence comprises a subset of bits from the first sequence. Other circuits, systems, and methods are also disclosed and claimed.

BRIEF DESCRIPTION OF THE SEVERAL VIEWS OF THE DRAWING

FIG. 3 illustrates a synchronization code generator block which is effectively comparable to a circuit presented in a previously-filed patent application.

FIG. 4a depicts a sequence of 128 bits formed by combining bits selected from the set consisting of values A and B as well as their respective complements −A and −B.

DETAILED DESCRIPTION OF THE INVENTION

Figure 1:
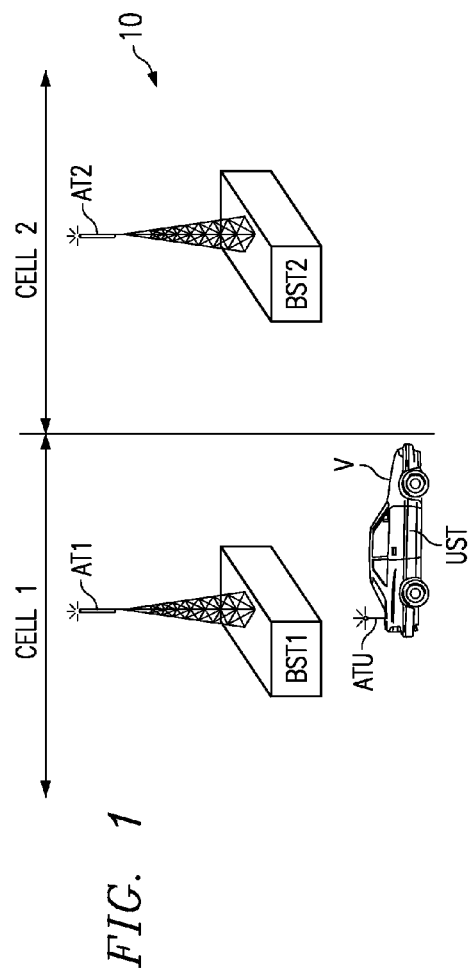
FIG. 1 illustrates a diagram of a cellular communications system by way of a contemporary code division multiple access ("CDMA") example in which the preferred embodiments operate.

FIG. 1 illustrates a diagram of a cellular communications system 10 by way of a contemporary code division multiple access ("CDMA") or wideband CDMA ("WCDMA") example in which the preferred embodiments operate. Within system 10 are shown two base stations BST1 and BST2. Each base station BST1 and BST2 includes a respective antenna AT1 and AT2 from which each may transmit or receive CDMA signals. The general area of intended reach of each base station defines a corresponding cell; thus, base station BST1 is intended to generally communicate with cellular devices within Cell 1 while base station BST2 is intended to generally communicate with cellular devices within Cell 2. Of course, some overlap between the communication reach of Cells 1 and 2 exists by design to support continuous communications should a communication station move from one cell to the other. Indeed, further in this regard, system 10 also includes a user station UST, which is shown in connection with a vehicle V to demonstrate that user station UST is mobile. In addition, by way of example user station UST includes a single antenna ATU for both transmitting and receiving cellular communications.

In some respects, system 10 may operate according to known general techniques for various types of cellular or other spread spectrum communications, including CDMA communications. Such general techniques are known in the art and include the commencement of a call from user station UST and the handling of that call by either or both of base stations BST1 and BST2. Other techniques are ascertainable by one skilled in the art.

One aspect of operation of system 10 which is further enhanced according to the preferred embodiments, and which in various respects is also reflected in the prior art, includes a technique known as soft handoff. At this point by way of introduction, note that soft handoff typically occurs as user station UST is located in an area that is near the common border between Cells 1 and 2. For example, assume that user station UST is progressing from a first location, closer to base station BST1, to a second location, closer to base station BST2. In this instance, soft handoff is the process that attempts to maintain the communications with user station UST as it moves from base station BST1 to base station BST2. This process involves operations both at base stations BS1 and BS2 as well as at user station UST, some of which are implemented according to the prior art while such operations are cumulatively improved upon by the implementation of the preferred embodiments. To simplify the discussion, both the prior art and the improvements thereto are separately addressed below.

According to the prior art, to achieve soft handoff base stations BST1 and BST2 detect the change in relative physical location of user station UST by processing signal communications from user station UST. Alternatively, user station UST may identify a sufficiently strong signal from base station BST2 and inform base station BST1 which currently supports the communication with user station UST. Base station BST2 thus becomes a candidate for soft handoff. A system controller may decide to initiate the soft handoff process based on the available resources at base station BST2 and other system conditions. Initially during this time, both base stations BST1 and BST2 are communicating signals with the same information in them to user station UST, and user station UST properly identifies and demodulates the signals so that the user of user station UST perceives receipt of only a single information data stream. As user station UST continues on its path, however, the controller may issue appropriate control so that one base station (e.g., BST1) is eventually controlled to drop (i.e., discontinue) its communications with user station UST while the other base station (e.g., BST2) is controlled to continue its communications with user station UST; this process is performed in a manner that preferably is unnoticeable to user station UST. In this manner, therefore, one base station "hands off" the communication to the other base station.

The present inventive scope is directed to synchronization either at start up of user station UST or within the operations described above relative to soft handoff, where in either case the inventive scope relates to primary synchronization code ("PSC") and secondary synchronization code ("SSC") transmissions by base stations BST1 and BST2 and the identification of those codes by user station UST. As introduced earlier in the Background Of The Invention section of this document, each base station BST1 and BST2 (and any others) has a unique SSC. Thus, when user station UST is moving from cell 1 corresponding to base station BST1, to cell 2, corresponding to base station BST2, then user station UST attempts to receive communications from base station BST2; in this effort, user station UST must identify the SSC of base station BST2. Further, it is assumed that user station UST previously identified the SSC of base station BST1 because such an operation would have been earlier required assuming either that user station UST was turned on while vehicle V was within Cell 1 or that user station UST previously moved into Cell 1 from yet another cell (i.e., an earlier soft handoff occurred). In any event, as a prerequisite to full signal communications, user station UST must first identify the SSC for a base station (e.g., base station BST2) because only after that event can user station UST properly decode data transmissions from that base station. Given the preceding, the preferred embodiments are directed to improving the communication of an SSC from a base station to a user station, as implemented in the transmission of the SSC by a base station and the identification of the SSC by a user station.

Figure 2:
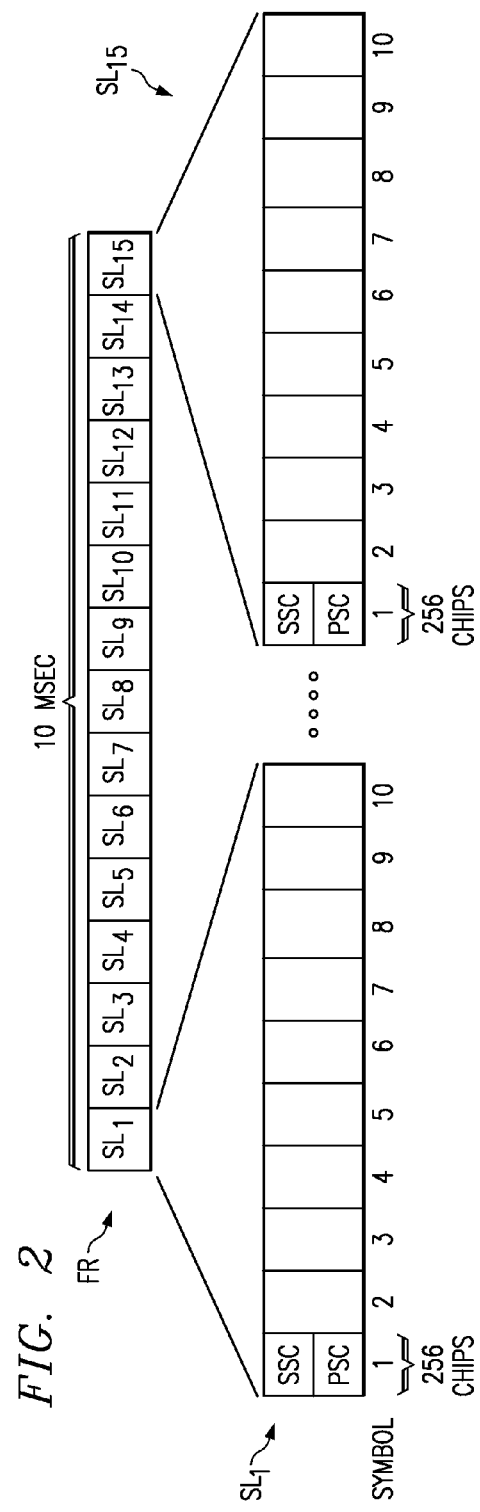
FIG. 2 illustrates a CDMA communication frame FR within which the preferred embodiment may be embedded.

By way of further introduction, FIG. 2 illustrates a CDMA communication frame FR within which the preferred embodiment codes may be embedded, where the general timing associated with frame FR and its division into portions as described below are known in the art. Frame FR is 10 milliseconds long and is divided into equal duration slots. In the past it was proposed in connection with the 3G standard that the number of these equal duration slots equals 16, while more recently for purposes of harmonization the standard has been modified to propose that each frame includes 15 equal duration slots. Thus, for consistency, the following discussion will address the example of 15 slots in a frame, while one skilled in the art will readily appreciate how the preferred embodiments may be modified to accommodate 16 (or some other number of) slots in a frame and where certain embodiments detailed later are directed to a 15-slot frame while another embodiment is directed to a 16-slot frame. In any event, before harmonization each of the 16 slots had a duration of 625 microseconds, while after harmonization each of the 15 slots has a duration of 667 microseconds. For the sake of reference, 15 such slots are shown in FIG. 2 as $SL_1$ through $SL_{15}$, and slots $SL_1$ and $SL_{15}$ are expanded by way of examples to illustrate the following further details.

Each slot, including therefore slots $SL_1$ and $SL_{15}$, corresponds to the communication of 10 CDMA symbols. Further, CDMA communications are modulated using a spreading code which consists of a series of binary pulses, and each piece of CDMA signal transmitted according to this code is said to be a "chip." One current CDMA transfer rate is 3.84 Mchips/second and, thus, the 10 millisecond frame FR includes 38,400 chips (i.e., 3.84 Mchips/second*10 milliseconds=38,400). As a result, each of the 15 slots accommodates a total of 2,560 chips (i.e., 38,400 chips/15 slots=2,560), and each of the 10 CDMA symbols within a slot is modulated with 256 chips (i.e., 2,560 chips/slot 1 slot/10 symbols=256).

Returning now to aspects of synchronization between a base station and user station, and recalling that each base station BST1 and BST2 transmits a unique SSC, note further that SSC detection by user station UST is actually part of a second stage of signal acquisition which is preceded in the prior art by a first stage of acquisition according to the PSC also transmitted by each base station. Looking to the first stage of acquisition, the PSC is the same for all base stations. To illustrate the PSC and looking to slots $SL_1$ and $SL_{15}$ in FIG. 2 as examples, each such slots depicts that the PSC is transmitted as one symbol per slot, that is, it is modulated as 256 chips. Further, because frame FR includes 15 slots, then the PSC is communicated 15 times per frame. Also, each communication of the PSC is in the same relative symbol location as for all other slots and, by way of example in FIG. 2, each PSC is therefore located at the location of symbol 1 for each slot. Given the PSC, user station UST attempts to detect its existence, such as through the use of a match filter or the like during the first stage of acquisition. Once the PSC is detected, user station UST is thereby aware of the periodic timing for frame FR, and this same timing detection may be made for successive frames by detecting their PSCs.

FIG. 2 also illustrates the inclusion of the SSC in frame FR. The transmission of each SSC and its detection by a user station UST relates to what is referred to in the art as the second stage of acquisition in the synchronization process, as improved upon using the preferred embodiments. In the preferred embodiment, a portion of the SSC is transmitted in the same symbol location as each PSC, as illustrated by example at the location of symbol 1 in slots $SL_1$ and $SL_{15}$ in FIG. 2 (and, although not shown, also therefore in the symbol 1 location for the remaining slots in frame FR). Thus, 15 portions of the SSC are included within $SL_1$ through $SL_{15}$ of frame FR, with the entirety of those 15 portions forming the complete SSC for the base station that is transmitting frame FR. Further, the entirety of all 15 portions of the SSC for a frame are sometimes referred to in the art as a comma free code for the base station, and each of the 15 portions is therefore referred to as a comma free code word. Lastly, and as stated above, the SSC is unique to each different base station, while the PSC is the same for multiple base stations.

By way of additional background to PSCs and SSCs, FIG. 3 illustrates a synchronization code generator block 20 which is effectively comparable to such a circuit presented in U.S. Pat. No. 7,039,036, issued May 2, 2006 and which is hereby incorporated herein by reference. The reader is invited to review the incorporated patent application in greater detail, but it is noted here that the transmission of the SSCs and PSCs therein is in an effort to render those signals orthogonal with respect to one another and to thereby enhance the ability of a user station to detect those simultaneously-transmitted codes. Additional details regarding the incorporated patent application are also discussed below by way of further context for the preferred embodiments.

Looking in detail to FIG. 3, block 20 has a first output 20$_1$ for providing a PSC and a second output 20$_2$ for providing an SSC. Each of these signals is further discussed separately below.

The PSC provided by output 20$_1$ is provided by a first pattern block 22. Pattern block 22 represents some manner of providing a sequence of bits, where those bits may be produced by various circuits or stored as factors. The values of first pattern block 22 represent a generalized hierarchical Golay sequence, as known in the art and as further detailed in the incorporated patent application Ser. No. 09/316,193. Further, the sequence from first pattern block 22 is a 256 bit sequence and, thus, these 256 bits are output periodically as the PSC. Lastly, note that in the incorporated patent application this Golay sequence is shown as coupled to an exclusive OR circuit which further receives a sequence of 256 zeroes; however, the result of this exclusive OR operation therefore simply produces the input Golay sequence and, thus, for the sake of simplicity, this additional structure is not shown in FIG. 3.

The SSC provided by output 20$_2$ is the output of an exclusive OR circuit 24, where a first input 24$_1$ of exclusive OR circuit 24 receives values from a second pattern block 26 and a second input 24$_2$ of exclusive OR circuit 24 receives values from first pattern block 22 (i.e., the Golay sequence). Second pattern block 26 produces a pattern of 256 bits, where these bits also represent a Golay sequence. Thus, exclusive OR circuit 24 receives two Golay sequences and each signal is orthogonal with respect to one another. Further in this regard, FIGS. 4a and 4b further depict the orthogonal sequence provided by second pattern block 26 to input 24$_1$ as now described. The pattern of FIG. 4a includes two eight-bit Golay sequences A and B, where these values may be produced by various circuits or stored as factors, and are as follows:

A={1, 1, −1, 1, 1, 1, 1, −1}
B={1, 1, −1, 1, −1, −1, −1, 1}

Figures 4B, 5, 6:
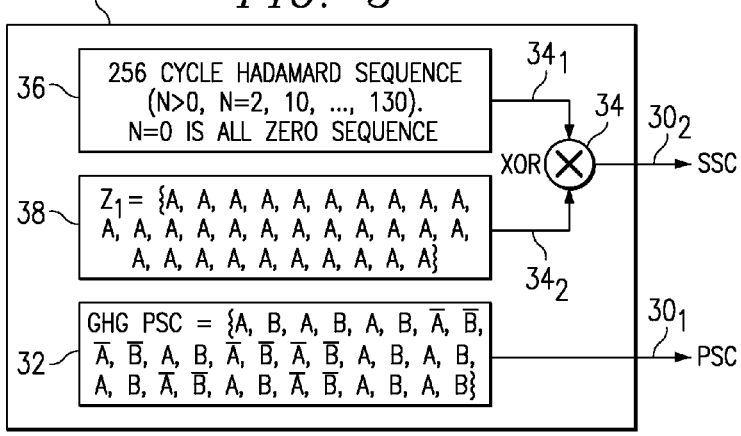
FIG. 4b depicts the combination of sequence pairs from FIG. 4a to create 256-bit sequences.
FIG. 5 illustrates a synchronization code generator block in accordance with one preferred embodiment.
FIG. 6 illustrates a table providing the maximum aperiodic side lobe ("MAS") which results by measuring correlation as between each of 17 individual 256-bit codes when produced using the synchronization code generator block of FIG. 5.

For each of seventeen sequences $X_1$ through $X_{17}$ shown in FIG. 4a, it is formed by a combination of A and B and their complements (shown as −A and −B, respectively). Each of the seventeen rows of FIG. 4a, therefore, includes a different 128 bit sequence that is orthogonal to the other sequences. Further, to form each 256 bit sequence, a first 128-bit sequence from FIG. 4a is concatenated with its complement as shown in FIG. 4b, thereby producing a total of seventeen sequences S(0) through S(16). Sequences S(0) through S(16) are coupled to input 24$_1$ of exclusive OR circuit 24 which operates on them and the corresponding Golay sequence bits received from first pattern block 22, with the result being the SSC produced at output 20$_2$.

Given the preceding relating to the generation of the PSC and SSC, and also having illustrated the previous approach of synchronization code generator block 20 in FIGS. 3 through 4b, each of these aspects is directed to a goal of improving the likelihood of correct identification of the PSC and SSC at user station UST. While the approach of FIGS. 3 through 4b endeavors to satisfy that goal, it has been observed in connection with the present inventive embodiments that still further gains may be made in this regard. Thus, the remaining discussion is directed to alternative approaches within the inventive scope for generating the PSC and SSC for use in a system such as system 10 and for inclusion in a frame such as frame FR, where proper detection of the PSC and SSC and the operations resulting from that detection are improved over previous approaches.

FIG. 5 illustrates a synchronization code generator block 30 in accordance with one preferred embodiment. Block 30 has a first output $30_1$ for providing a PSC and a second output $30_2$ for providing an SSC. These synchronization codes, and the circuits producing them, are further discussed below.

The PSC provided by output $30_1$ is provided by a first pattern block 32. Pattern block 32 represents some manner of providing a hierarchical sequence of bits having favorable autocorrelation properties; for the sake of reference, such bits are shown generally in FIG. 5 by values A and B (and their complements), where those bits may be produced by various circuits or stored as factors or in a memory or the like. In the preferred embodiment, the values of first pattern block 32 represent a generalized hierarchical Golay sequence, as generally known in the art. As to the specific sequence, it is repeated here in the text as:

Golay sequence={A, B, A, B, A, B, −A, −B, −A, −B, A, B, −A, −B, −A, −B, A, B, A, B, A, B, −A, −B, A, B, −A, −B, A, B, A, B}

With respect to those bits, various observations may be made. First, each of A and B represents an 8-bit value. Second, there are a total of 32 eight-bit values in block 32, thereby producing a 256-bit PSC which repeats once those 256 bits are transmitted. Third, the PSC from block 32 is presented by combining two different 8-bit values, namely, A, and B, as well as their respective complements, −A and −B. The values for A and B are as follows:

A={1, 1, 1, 1, 1, 1, −1, −1}
B={1, −1, 1, −1, 1, −1, −1, 1}

Finally, it is noted that the values shown for A and B are indicated as real values but would translate to binary bit numbers by converting a −1 real value to a binary value of 1 and by converting a 1 real value to a binary value of 0.

The SSC provided by output $30_2$ is the output of an exclusive OR circuit 34, where a first input $34_1$ of exclusive OR circuit 34 receives values from a second pattern block 36 and a second input $34_2$ of exclusive OR circuit 34 receives values from a third pattern block 38. The values from pattern blocks 36 and 38 may be produced by various circuits or stored as factors or in a memory or the like. Further, each of the bit sequences produced by second pattern block 36 and third pattern block 38 is separately discussed below.

Second pattern block 36 produces a 256-bit code selected from a set of various possible 256-bit codes, where each 256-bit code in the set is preferably orthogonal with respect to all other 256-bit codes in the set. In the preferred embodiment, the set of codes are derived from what is referred to in the art as Hadamard codes, which are a type of Walsh codes. The Hadamard codes of second pattern block 36 are derived from combining sequences of basic Walsh codes starting from length two, and increasing the lengths to develop various different alternative codes, while maintaining orthogonality between each different set of codes. For example, Table 1 below illustrates two basic Walsh codes each having two bits (i.e., length two).

TABLE 1

| Code identifier | Bit sequence | |
| --- | --- | --- |
| $C1_2$ | 1 | 1 |
| $C2_2$ | 1 | −1 |

The identifiers for the codes in Table 1 have a subscript "2" to designate the 2-bit length of the code, and the remainder of the identifier is unique to discuss each different code. The two codes in Table 1 are orthogonal to one another as proven by multiplying the bits in the first location of each code to form a first product and then summing that product with the product of the bits in the second location of each code, where orthogonality is confirmed so long as the sum equals zero; for the case of Table 1, therefore, this sum indeed equals zero (i.e., [(1*1)+(1*−1)]=0) and, hence, code $C1_2$ is orthogonal to code $C2_2$.

Using the bit values in Table 1 as a basis, they may be expanded to produce four codes, each having four bits (i.e., length four) as shown in the following Table 2:

TABLE 2

| Code identifier | Bit sequence | | | |
| --- | --- | --- | --- | --- |
| $C1_4$ | 1 | 1 | 1 | 1 |
| $C2_4$ | 1 | −1 | 1 | −1 |
| $C3_4$ | 1 | 1 | −1 | −1 |
| $C4_4$ | 1 | −1 | −1 | 1 |

The shading used to enclose quadrants of bits in Table 2 assists in understanding the development of its sequences from Table 1. Specifically, the basic codes from Table 1 are repeated in Table 2 according to the values and ordering of the bits in Table 1. More particularly, in the codes of Table 1 note that three of the bit values equal 1, whereas a fourth bit value equals −1. Using these values as a basis to derive Table 2, then the entire pattern of four bits in Table 1 is duplicated and placed in a quadrant position in Table 2 that corresponds to a comparable bit position in Table 1. Thus, in Table 1, across the upper row there are two values of 1 and, thus, in Table 2, across the upper two quadrants, the basis from Table 1 is copied into those two quadrants. Similarly, in Table 1, in the left location along the lower row there is a value of 1 and, therefore, in Table 2, in the lower left quadrant the basis from Table 1 is copied into that quadrant. Conversely, in Table 1, in the right location along the lower row there is a value of −1 and, therefore, in Table 2, in the lower right quadrant the complement of the basis from Table 1 is copied into that quadrant. Finally, from Table 2, one skilled in the art may readily confirm that each 4-bit code therein is also orthogonal with respect to every other code in the Table, as again confirmed by summing the product of all like-positioned bits in the code, where the result of the sum equals zero.

Given Tables 1 and 2, the same pattern established to increase the code length such as from two bits in Table 1 to four bits in Table 2 may be repeated in increasing fashion to develop a set of 256 codes, where each of those codes has a length of 256 (i.e., 256 bits selected from the set of 1 and −1). The resulting 256-bit codes give rise to the Hadamard codes for use by second pattern block 36. Specifically, once these length 256 Hadamard codes are established, the codes used in second pattern block 36 are found by selecting a subset of those codes. Specifically, for the example of FIG. 5, every eighth code from the set is selected until a total of 17 total codes have been chosen, and let these 17 codes be referred to as $C1_{256}$ through $C17_{256}$. Further, in selecting every eighth code in the embodiment of FIG. 5, the first pattern from which the codes may be selected is assumed to be 256 values all equal to −1 and corresponds to an index value N=0, while $C1_{256}$ is actually selected to correspond to an index of N=2; thereafter, each eighth code is selected, that is, the additional selections correspond to N=10, N=18, and so forth whereby the seventeenth code $C17_{256}$ corresponds to N=130. Finally, having derived the 17 codes described, for every base station having a code generator block 30, it was assigned a unique group of 16 codes prior to harmonization (or 15 codes after harmonization), where the unique group is selected from these 17 codes and ordered in a particular sequence; further, within this group one or more of the 16 codes may be a repeated one of the total 17 codes. For example, a group of 16 such codes might be as shown in the following Table 3:

TABLE 3

| Sequence number | Code |
|---|---|
| 1 | $C1_{256}$ |
| 2 | $C14_{256}$ |
| 3 | $C12_{256}$ |
| 4 | $C13_{256}$ |
| 5 | $C5_{256}$ |
| 6 | $C9_{256}$ |
| 7 | $C12_{256}$ |
| 8 | $C16_{256}$ |
| 9 | $C3_{256}$ |
| 10 | $C7_{256}$ |
| 11 | $C4_{256}$ |
| 12 | $C16_{256}$ |
| 13 | $C2_{256}$ |
| 14 | $C6_{256}$ |
| 15 | $C8_{256}$ |
| 16 | $C5_{256}$ |

Thus, for the example in Table 3, second pattern block 36 provides a sequence of 16 codes, with each code having 256 bits.

Turning now to third pattern block 38, it provides a bit sequence designated generally as $Z_1$ and which consists of the value A, as used in block 32, where in block 38 the value A is repeated to match the number of bits output by second pattern block 36; thus, since second pattern block 36 outputs 256 bits at a time as shown above, then third pattern block 38 also outputs 256 bits, where these latter bits are the value A repeated 32 sequential times (i.e., 32 times*8 bits in value A=256 bits). In other words, $Z_1$ is as follows:
$Z_1$={A, A, A, A, A, A, A, A, A, A, A, A, A, A, A, A, A, A, A, A, A, A, A, A, A, A, A, A, A, A, A, A}

The operation of synchronization code generator block 30 is now explored. First, the generation of the PSCs is relatively straightforward in that the Golay values from first pattern block 32 provide the PSCs, and preferably according to the above-described values of A and B and according to the sequence shown in FIG. 5. Second, the generation of the SSCs arises from the operation of exclusive OR circuit 34. Specifically, the Hadamard codes from second pattern block 36 are essentially masked by the sequence $Z_1$ from third block 38. Recalling that the sequence $Z_1$ from third pattern block 38 is based on the value A, it may be further stated therefore that this masking value consists of a multi-bit (e.g., eight bits for A) subset of the Golay sequence used for the PSC. The result of this exclusive OR operation is the SSC, that is, the SSC is formed in response to the Hadamard codes from second pattern block 36 and the sequence $Z_1$ from third block 38, and the resulting SSC is presented at output 30₂. Further, from the preceding it now may be appreciated that the exclusive OR operation produces a total of 16 quantities, each having 256 bits. Recall also from FIG. 2 that the SSC is communicated in portions (or comma free words), with each portion occupying a same symbol location in one of the 16 slots (e.g., 16 slots before harmonization, or 15 slots after harmonization). Given this relationship, it now should be appreciated that each of those portions corresponds to one of the 16 codes from second pattern block 36 after it is exclusive OR'd with the repeated value of A. Further, by using the masking value of A in this manner, it has been determined that the SSCs produced by synchronization code generator block 30 have a low aperiodic auto correlation with the PSC. Accordingly, there is an improved likelihood that user station UST will properly distinguish the PSC from the SSC, thereby improving overall system operations. Finally, note that while the preferred embodiment includes the exclusive OR operation to generate the SSC as discussed above, in an alternative embodiment the actual operation could be eliminated by merely storing the resulting bits of that operation in a memory, look-up table, or the like, and then just outputting those bits as the SSC. In this alternative embodiment, therefore, the resulting bits are still in response to the sequences in block 36 and 38 in that they are derived from those sequences, yet the derivation is achieved in some other fashion such as hard coding the bits after determining them rather than generating them dynamically using an exclusive OR operation.

While synchronization code generator block 30 has been shown to provide better operability over previous approaches, it is further recognized within the present inventive scope that synchronization code generator block 30 may be improved further via an alternative embodiment. Before proceeding with such an alternative embodiment, the improvements it provides may be appreciated first by further analysis of the resulting operation of synchronization code generator block 30. In this regard, it has been observed in connection with the present inventive scope that there is room for improvement among the aperiodic cross correlations of the different SSCs produced by synchronization code generator block 30, as further discussed below.

FIG. 6 illustrates a table providing the maximum aperiodic side lobe ("MAS") which results by measuring correlation between each of the individual 17 codes identified above as $C1_{256}$ through $C17_{256}$ as produced using synchronization code generator block 30, where for simplicity sake in FIG. 6 the 17 codes are only identified by numbers 1 through 17 across the top row and left column of the table. The MAS reflected in FIG. 6 is determined over all the 256 chip time shifts for each code versus itself and other codes for 0 Hz frequency error. For example, the MAS for code 1 relative to code 2 is 8, whereas the MAS for code 1 relative to code 17 is 128. Given the values in FIG. 6, one skilled in the art will appreciate that the cross-correlations between codes may be considered unfavorable, particularly as between certain codes. Specifically, apart from FIG. 6 it may be determined that the main peak of an SSC correlation with itself is 256; however, from FIG. 6, it may be seen that the cross-correlation between some SSCs and other SSCs approach this same 256 peak value. For example, the MAS from code 2 to code 3 is 248, and as another example the MAS from code 4 to code 6 is 240. Thus, these and the other relatively high cross-correlations may make it more difficult for user station UST to properly detect the actual SSC being transmitted by a base station.

Figure 7:
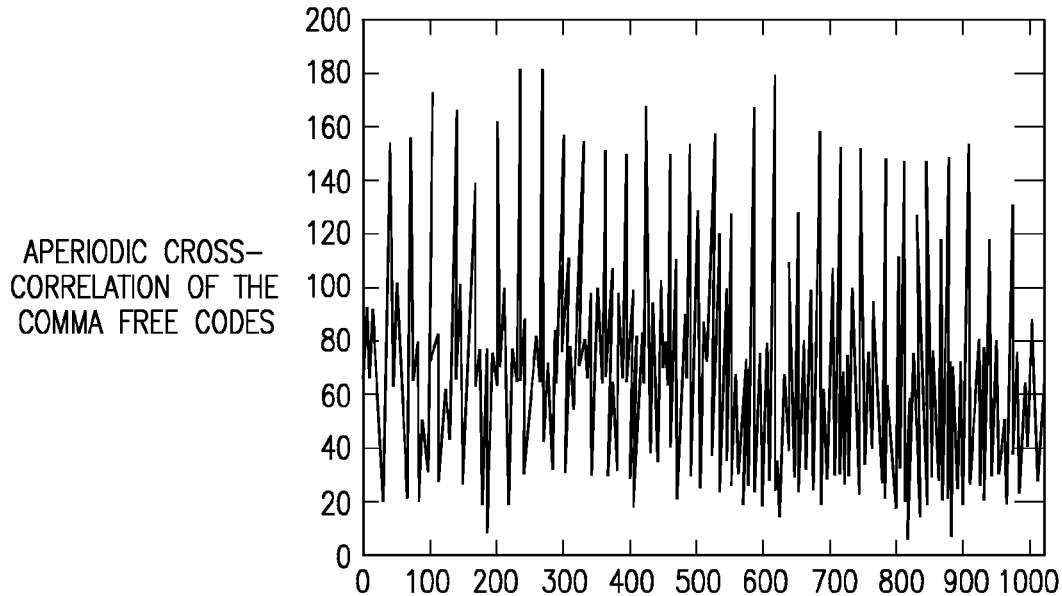
FIG. 7 depicts the correlation as between 32 comma free codes made from the individual 17 codes of FIG. 6.

FIG. 7 further illustrates the ability to improve the production of SSCs by synchronization code generator block 30 in that FIG. 7 depicts the correlation as between 32 comma free codes made from the individual 17 codes identified above as $C1_{256}$ through $C17_{256}$. Specifically, FIG. 7 illustrates for 32 comma free codes the correlation between each of those comma free codes, each consisting of 16 codes from the set of codes $C1_{256}$ through $C17_{256}$, and all other of those comma free codes. Further, FIG. 7 illustrates the correlation given non-coherent averaging over one frame and with an 8-chip offset. Even with the averaging, the following two observations may be made. First, the aperiodic auto correlation of the comma free codes is relatively high (e.g., up to approximately 180) even after one frame of averaging. In practice, depending upon the multipath this may or may not be a concern; however, it is preferable as is achieved by an alternative embodiment below to reduce the aperiodic auto correlation of the comma free codes. Second, the aperiodic cross correlation of the comma free codes is also relatively high (e.g., up to approximately 130) even after one frame of averaging. The normalized maximum correlation is 256, implying that the aperiodic cross correlation could be only 6.0 dB below the main peak in the worst case. This would mean that if there were a second base station (e.g., BST2) whose synchronization channel is received eight chips apart from base station BST1, then depending on the relative powers, the second base station could adversely affect the second stage of acquisition for user station UST trying to acquire communications with base station BST1. Finally, it may be noted that shifts other than multiple of eight chips also may have undesirable cross correlation properties while shifts in the multiples of eight chips may result in the worst case of such properties; thus, an improvement may be achieved by providing an alternative embodiment in which the aperiodic cross correlations of the SSCs and also of the comma free codes is reduced, as is achieved by such an embodiment discussed below.

Figure 8:
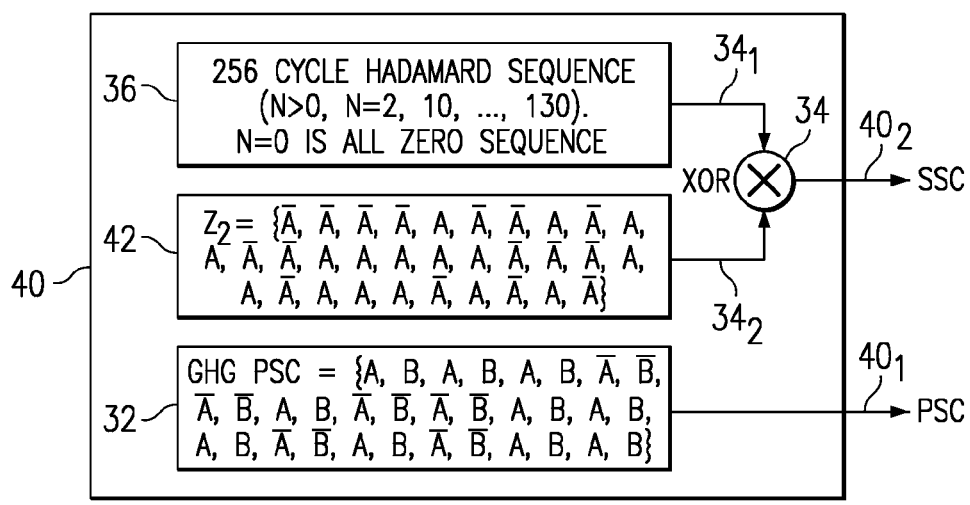
FIG. 8 illustrates a synchronization code generator block as an alternative preferred embodiment.

FIG. 8 illustrates a synchronization code generator block 40 as an alternative preferred embodiment. Block 40 has a first output $40_1$ for providing a PSC and a second output $40_2$ for providing an SSC. Generally, block 40 implements many of the same aspects as synchronization code generator block 30 shown in FIG. 5 and, thus, like reference numerals are carried forward from FIG. 5 to FIG. 8 with respect to such aspects. Briefly addressing those common aspects, synchronization code generator block 40 provides its PSC as a Golay sequence from a first pattern block 32, and synchronization code generator block 40 provides its SSC as an output from an XOR circuit 34 which has one input $34_1$ coupled to receive a Hadamard sequence from a second pattern block 36 and another input $34_2$ coupled to receive a masking pattern, $Z_2$. Masking pattern $Z_2$ for block 40, however, is different than masking pattern $Z_1$ used in block 30 of FIG. 5, and this difference is further discussed below.

Looking now more specifically to masking pattern $Z_2$, it is provided from a third pattern block 42, again where the values shown therein may be produced by various circuits or stored as factors or in a memory or the like. Further, the value of the bits in $Z_2$ are based on either the value A or its complement, where the latter is shown in FIG. 8 as A or, for consistency with other representations above, also may be referred to as −A. In any event, the sequence for $Z_2$ is also 256 bits, and is as follows:

$Z_2$={−A, −A, −A, −A,A, −A, −A,A, −A,A,A, −A, −A,A,A, A,A,A, −A, −A, −A,A,A, −A,A,A,A, −A,A, −A,A, −A}

Thus, pattern $Z_2$, like pattern $Z_1$ above, is based on a subset of values also used in the Golay sequence used for the PSC. For pattern $Z_2$, this subset is formed from both values A and −A, whereas for pattern $Z_1$ it was formed only by the value A. In any event, the bits of $Z_2$ from third pattern block 42 are applied via exclusive OR circuit 34 to the corresponding 256 Hadamard bits from second pattern block 36; this operation thereby masks the bits from second pattern block 36 with the 8-bit increments according to either the value A or its complement. The result of this exclusive OR operation is the SSC, as presented at output $40_2$. Additionally, while the preferred embodiment of block 40 includes the exclusive OR operation to generate its SSC, in an alternative embodiment the actual operation could be eliminated by merely storing the resulting bits of that operation in a memory, look-up table, or the like, and then just outputting those bits as the SSC. In this alternative embodiment, therefore, the resulting bits are still in response to the sequences in block 36 and 42 in that they are derived from those sequences, yet the derivation is achieved in some other fashion rather than generating them dynamically using an exclusive OR operation.

The operation of synchronization code generator block 40 is now explored, although a detailed discussion of various aspects is unnecessary given the comparable nature to block 30 discussed earlier. The generation of the PSCs in block 40 is the same as for block 30 and, thus, provides the Golay values directly from first pattern block 32 according to the above-described values of A and B and according to the sequence shown in both FIG. 5 and FIG. 8. The generation of the SSCs arises from the operation of exclusive OR circuit 34, where for block 40 the Hadamard codes are the same as for block 30 while those codes are masked by a different sequence, namely, by $Z_2$ from third pattern block 42. Note, however, that while masking pattern $Z_2$ differs from masking pattern $Z_1$, pattern $Z_2$ is also a multi-bit (e.g., eight bits for A or its complement) subset of the block 32 Golay sequence used for the PSC. Here again, by using a masking value in this manner, it has been determined that that the SSCs produced by synchronization code generator block 40 have a low aperiodic auto correlation with the PSC and, indeed, this low correlation is comparable to that of block 30; thus, the performance of the first stage of acquisition is relatively comparable for block 40 notwithstanding the change from $Z_1$ to $Z_2$ as a masking sequence. In addition and as explored below, however, the use of masking pattern $Z_2$ in lieu of masking pattern $Z_1$ also improves the aperiodic cross correlations of the SSCs and also of the comma free codes for block 40.

Figures 9, 10:
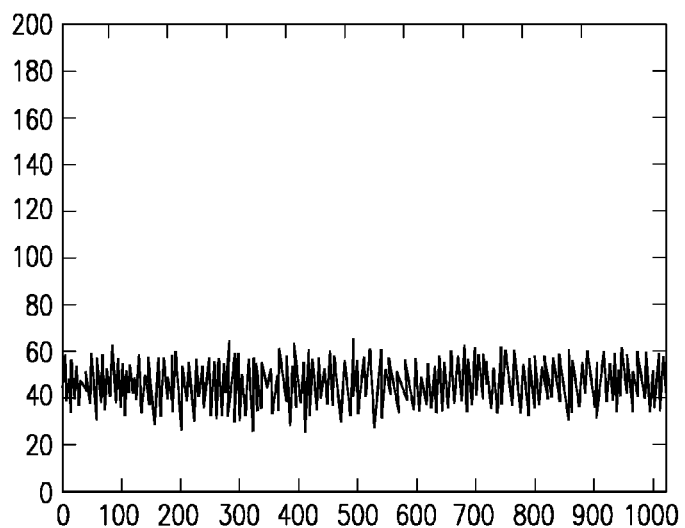
FIG. 9 illustrates a table providing the MAS which results by measuring correlation as between each of 17 individual 256-bit codes when produced using the synchronization code generator block of FIG. 8.
FIG. 10 depicts the correlation as between 32 comma free codes made from the individual 17 codes of FIG. 9.

FIG. 9 illustrates a table providing the MAS with respect to synchronization code generator block 40 and for comparison to the comparable MAS table in FIG. 6 and corresponding to block 30; thus, FIG. 9 also depicts the correlation as between each of the individual 17 codes identified above as $C1_{256}$ through $C17_{256}$, as determined over all the 256 chip time shifts for each code versus itself and other codes for 0 Hz frequency error. As with the case of FIG. 6, the main peak of an SSC correlation with itself is 256. However, by comparing FIG. 9 with FIG. 6, it may be seen that the largest MAS for block 40 is considerably reduced versus that of synchronization code generator block 30. More particularly, in FIG. 9, the largest MAS is shown to be 128 (e.g., as between codes 9 and 17), whereas in FIG. 6, the largest MAS is shown to be nearly twice as high, that is, in FIG. 6 the largest MAS is 248 (e.g., as between codes 3 and 2). Thus, the cross-correlation values as between individual codes as presented by block 40 are improved over those from block 30.

FIG. 10 further illustrates the improved operation of synchronization code generator block 40 in that FIG. 10 depicts for block 40 a comparable plot to that shown in FIG. 7 for block 30; thus, FIG. 10 again plots the correlation as between each set of 32 comma free codes, each having 16 of the total individual 17 codes $C1_{256}$ through $C17_{256}$, where again the illustrated correlation is given non-coherent averaging over one frame and with an 8-chip offset. By comparing FIG. 10 to FIG. 7, various observations regarding improved performance of block 40 may be made. First, both the aperiodic auto and cross correlation of the comma free codes is now reduced to a maximum value of approximately 66 which is about 11.8 dB below the maximum correlation of 256. Second, recall it is noted above with respect to FIG. 7 that a time shift of eight chips is the worst case, yet the alternative embodiment of block 40 and as measured in FIG. 10 provides improved cross correlation for all time shifts, and even for the worst case instance of 8-chip shifts, the cross correlation is 11.8 dB below the maximum correlation of 256. Accordingly, the aperiodic cross correlation properties of the SSCs and the comma free codes are significantly improved for block 40. Finally, from the preceding benefits, it may be readily expected that the performance of stage two acquisition is further improved as a result of those benefits.

The preceding inventive teachings also encompass still additional embodiments based on various system considerations. For example, recall above it is noted that in the past it was proposed in connection with the 3G standard that comma free codes be selected as groups of 16 codes from a total set of 17 codes, where more recently for purposes of harmonization the standard has been modified to propose that each comma free code be formed as 15 codes selected from a total set of 16 (rather than 17) codes. Applying this modification to the present inventive teachings, one approach may be to simply discard the last selected code, $C17_{256}$, in the previously-described selection of codes $C1_{256}$ through $C17_{256}$. Recall that $C17_{256}$ corresponds to an index of N=18; thus, $C17_{256}$ could be eliminated as a possible code, thereby leaving only 16 codes from which each of 15 comma free codes may be formed. However, it is recognized in connection with the present embodiments that such an approach could mean that a length 32 Walsh-Hadamard transform will have to be used for those 16 codes. Thus, as an alternative approach to satisfy the harmonization change, still another embodiment is presented below.

Figure 11:
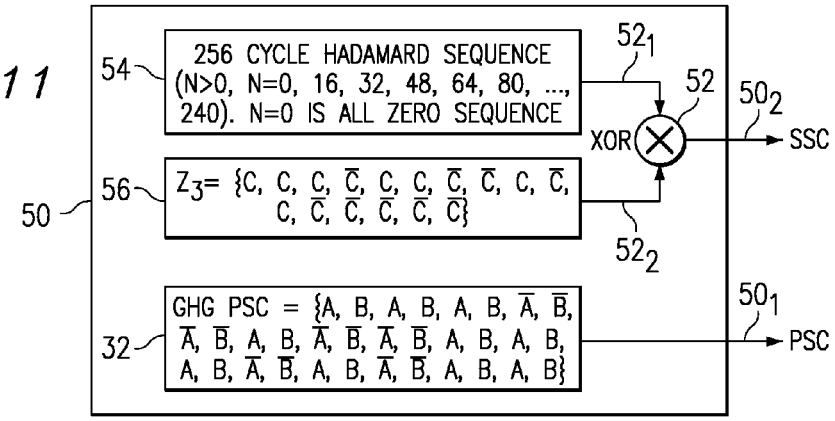
FIG. 11 illustrates a synchronization code generator block as another alternative preferred embodiment and directed to a harmonization change.

FIG. 11 illustrates a synchronization code generator block 50 as another alternative preferred embodiment, and which is directed to the harmonization change as well as the inventive teachings discussed above. Block 50 has a first output $50_1$ for providing a PSC and a second output $50_2$ for providing an SSC. Block 50 is comparable in various respects to synchronization code generator block 40 shown in FIG. 8 and, thus, the differences are primarily explored here with the commonality only briefly mentioned and understood to one skilled in the art based on the previous discussions. With respect to the common aspects, block 50 provides its PSC using a same Golay sequence from a first pattern block 32, and block 50 provides its SSC as an output from an XOR circuit 52; different reference numerals are used with respect to this XOR circuit because the values input to the circuit via its inputs $52_1$ and $52_2$ differ from previous embodiments, as further detailed below. However, in a general sense, it readily may be appreciated that XOR circuit 52 receives via its input $52_1$ a Hadamard sequence from a block 54, and which is derived in a different manner from that discussed above, and XOR circuit 52 receives via its input $52_2$ a masking sequence $Z_3$ from a block 56. In response to these inputs, XOR circuit 52 outputs the SSC on output $50_2$. Once more, of course, the actual exclusive XOR operation could be eliminated by merely storing the resulting bits of that operation in a memory, look-up table, or the like, and then just outputting those bits as the SSC.

Looking more specifically to the Hadamard sequence from block 54, recall first by way of contrast that in the FIG. 5 embodiment every eighth code from a set of 256-bit codes is selected until a total of 17 total codes have been chosen. In contrast, for block 54, every sixteenth code is selected from the set of 256-bit codes, and here starting at the index value of N=0. Thus, after the index of N=0, each sixteenth code is selected, that is, the additional selections correspond to N=16, N=32, and so forth whereby the sixteenth code for block 54 corresponds to N=240. Further, having selected the 16 codes, for every base station having a code generator block 50 its block 54 is assigned and uses a comma free code consisting of a unique group of 15 codes selected from these 16 codes and ordered in a particular sequence.

Looking now more specifically to masking pattern $Z_3$, it is provided from third pattern block 56, again where the values shown therein may be produced by various circuits or stored as factors. Here, the value of the bits in $Z_3$ are based on the value A and its complement and also on the value B and its complement. More particularly, first let the value C as shown in block 56 have the following value:

$C=\{A, -B\}$ where the values for A and B are the same as set forth earlier with respect to synchronization code generator block 30 of FIG. 5. Next, the sequence for $Z_3$ is also 256 bits, and may be represented in terms of the value C as follows:

$Z_3=\{C, C, C, -C, C, C, -C, -C, C, -C, C, -C, -C, -C, -C, -C\}$

Thus, pattern $Z_3$, like patterns $Z_1$ and $Z_2$ above, is based on a subset of the values also used in the Golay sequence used for the PSC. For pattern $Z_3$, however, this subset is formed from values A, -A, B, and -B, where each of those is a portion of the entire pattern used in the Golay sequence to provide the PSC. In any event, the bits of $Z_3$ from third pattern block 56 are applied via exclusive OR circuit 52 to the corresponding 256 Hadamard bits from second pattern block 36; again, this operation thereby masks the bits from third pattern block 56, where the mask here is with the 16-bit value of C or its complement. The result of this exclusive OR operation is the SSC, as presented at output $50_2$.

Figure 12:
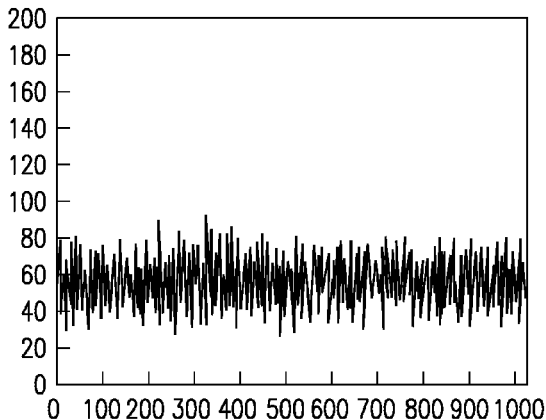
FIG. 12 depicts the correlation as between 32 comma free codes made from a group of 16 256-bit codes.

FIG. 12 further illustrates the operation of synchronization code generator block 50 in that FIG. 12 depicts for block 50 a comparable plot to that shown in FIG. 10 for block 40. With reference to FIG. 12, it plots the correlation as between each set of 32 comma free codes, each having 15 of the total individual 16 code words (i.e., rather than having 16 codes from a total set of 17 code words in FIG. 10). In FIG. 12, the illustrated correlation is given non-coherent averaging over one frame and with a 16-chip offset. By comparing FIG. 12 to FIG. 10, it may be seen that FIG. 12 approaches a comparable level for both the aperiodic auto and cross correlation of the comma free codes. Further, with respect to FIG. 12, the worst case aperiodic cross correlation among the comma free codes at the illustrated 16-chip offset after one frame averaging is also comparable to the worst-case cross-correlation of the SSCs shown in FIG. 10. Finally, however, the additional benefits of FIG. 12 may be realized using only 16 code words to thereby comply with the above-discussed harmonization request, and may be detected using a length 16 Walsh-Hadamard transform for stage two acquisition.

Figure 13:
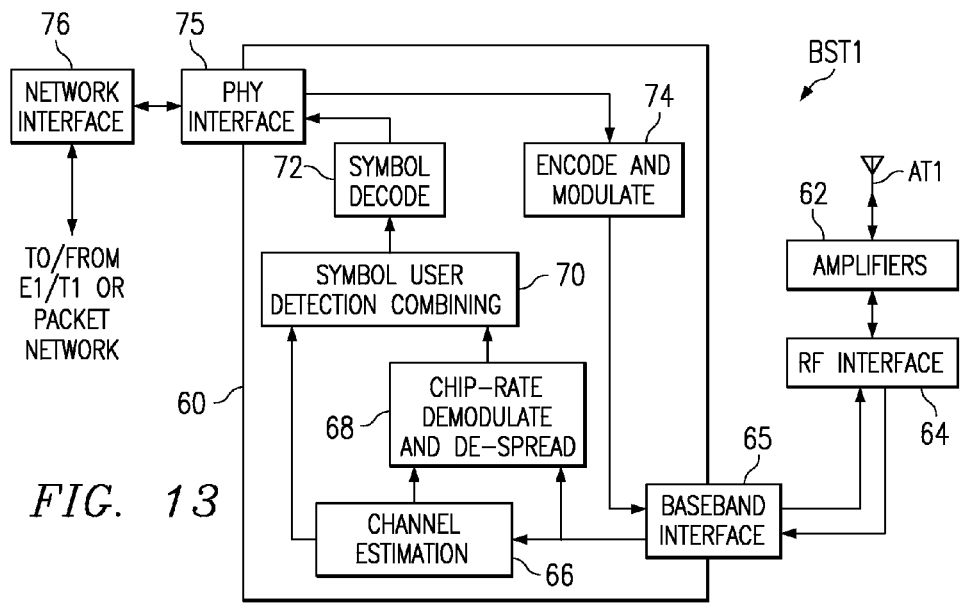
FIG. 13 illustrates a block diagram of base station BST1 and in which any of the various embodiments of synchronization code generator blocks may be implemented.

FIG. 13 illustrates a block diagram of base station BST1 (or BST2) and in which any of the various embodiments of synchronization code generator blocks may be implemented. With reference to FIG. 13, a construction of base station BST1 according to a preferred embodiment is now described. One skilled in the art will appreciate that this particular architecture is provided by way of example only, and that other base station architectures may be used according to the present inventive scope.

As shown in FIG. 13, base station BST1 includes amplifiers 62 for driving amplified transmission signals over base station antenna AT1 (or multiple antennas), and for amplifying signals received from antenna AT1. RF interface function 64 includes the appropriate transmit and receive formatting and filtering circuitry. Additionally, RF interface function 64 includes analog-to-digital converters for digitizing the amplified receive signals, and digital-to-analog converters for placing the transmitted signals into the analog domain. As such, RF interface function 64 communicates digitally with baseband interface 65, which provides the appropriate signal formatting between RF interface function 64 and baseband device 60.

Baseband device 60 communicates with the ultimate network, which may be of the E1 or T1 class, or a packet network as shown in FIG. 13, by way of physical layer interface 75 and network interface adapter 76. Physical layer interface 75 and network interface adapter 76 are conventional subsystems, selected according to the type of network and corresponding interface desired for base station BST1.

Baseband device 60 performs the digital signal processing functions in handling the wireless communications at base station BST1, where such functions include among many others the function of creating and embedding the PSCs and SSCs according to any of the synchronization code generator blocks discussed earlier. To perform these functions, it is contemplated that baseband device 60 will be a subsystem including one or more high-performance digital signal processor (DSP) devices, such as those of the TMS320c5x and TMS320c6x class of DSPs available from Texas Instruments Incorporated, along with the appropriate memory and external functions suitable for handling the digital processing requirements of base station BST1. For FIG. 13, the implementation of baseband device 60 is described according to its various functions, rather than by way of its construction, it being contemplated that those skilled in the art will be readily able to realize baseband device 60 using such conventional integrated circuits from this functional description, and according to the capacity desired for base station BST1.

On the transmit side, baseband device 60 includes encode and modulate function 74, which is coupled between physical layer interface 75 and baseband interface 65, as shown in FIG. 13. Encode and modulate function 74 receives digital data from physical layer interface 75, and performs the appropriate digital processing functions for the particular protocol. For example, encode and modulate function 74 may first encode the received digital data into symbols. These symbols are then spread, by way of a spreading code, into a sequence of chips, according to a selected chip rate; the spreading may also include the spreading of the symbols into multiple subchannels. Typically, a cell-specific scrambling code is then applied to the spread symbols, so that a receiving wireless unit can distinguish transmissions generated by this base station BST1, from those of neighboring cells. In addition, encode and modulate function 74 may include the functionality of any of blocks 30, 40, or 50 described earlier, and thereby creates and inserts into a frame and at the proper symbol locations the PSCs and SSCs. Modulation of the spread symbols is then performed; commonly, the multiple subchannels are split into in-phase (I) and quadrature (Q) groups, so that the eventual modulated signal includes both components. The spread spectrum signal is then applied to baseband interface 65, after the appropriate filtering and pre-equalization for channel distortion, for transmission over antenna AT1 via RF interface function 64 and amplifiers 62.

On the receive side, baseband device 60 receives incoming digital signals from baseband interface 65, after digitization of the received signals within RF interface function 64. These signals are applied to chip-rate demodulation and despreading function 68, which derives the transmitted symbols from the digitized received data. Considering that base station BST1 receives signals over multiple channels, from multiple wireless units in its cell, channel estimation function 66 estimates the random channel variation. Channel estimation function 66 and chip-rate demodulation and despreading function 68 each provide output to symbol user detection and combining function, in which the demodulated data are associated with their respective channels, following which symbol decode function 72 decodes the received symbols, for each channel and thus each conversation, into a bit stream suitable for communication to the network via physical layer interface 75 and network interface function 76.

From the above, it may be appreciated that the above embodiments provide a transmitter for use in a wireless system and for communicating PSCs and SSCs for stage one and stage two acquisition. Further, while the present embodiments have been described in detail, various substitutions, modifications or alterations could be made to the descriptions set forth above without departing from the inventive scope. Indeed, various different embodiments have been described which assist in developing this inventive scope. In addition, still other changes may be made to the inventive teachings. For example, the base station transmitter of FIG. 13 is only one of many transmitter embodiments which may include a synchronization code generator block according to the teachings of this document. As another example, while a Hadamard sequence has been shown as preferable to be masked to form an SSC, other sequences taken from a set of orthogonal codes also may be used. As another example, while a Golay sequence has been shown as preferable to form a PSC, other hierarchical sequences having good autocorrelation properties may be used. Still further, while the masking sequences shown herein represent specific alterations to the Golay sequence wherein a subset of the Golay sequence is used to mask the Hadamard sequence, other subsets may be selected or individual bit values may be altered slightly so as not to depart from the inventive scope. As still another example, the masking operation preferably achieved with an exclusive OR operation may be achieved through other data manipulation as between a masking set of bits and a set of orthogonal codes (e.g., Hadamard sequences). From the above, therefore, one skilled in the art should further appreciate the inventive scope as defined by the following claims.

What is claimed is:

1. A method of forming synchronization codes for a wireless communication device, comprising:
   A. providing a primary synchronization code in response to a first sequence; and
   B. providing a secondary synchronization code in response to a second sequence and a third sequence, the third sequence being different from the first sequence;
      i. the second sequence is selected from a plurality of sequences, each of the plurality of sequences is orthogonal with respect to all other sequences in the plurality of sequences;
      ii. the second sequence includes a plurality of code words and each of the plurality of code words is selected from a plurality of Hadamard sequences;
      iii. the second sequence consists of fifteen of the code words; and
      iv. the third sequence includes a sequence of bits from the first sequence, the sequence of bits from the first sequence is repeated a plurality of times in the third sequence; and
   C. outputting the primary synchronization code and the secondary synchronization code from synchronization code generator circuitry.

2. The method of claim 1, wherein the first sequence includes a hierarchical sequence.

3. The method of claim 1, in which the first sequence includes a Golay sequence.

* * * * *